US009369714B2

(12) United States Patent
Kim et al.

(10) Patent No.: US 9,369,714 B2
(45) Date of Patent: Jun. 14, 2016

(54) METHOD FOR ENCODING/DECODING MOTION VECTOR AND APPARATUS THEREOF

(75) Inventors: Hayoon Kim, Gyeonggi-do (KR); Byeungwoo Jeon, Gyeonggi-do (KR); Yunglyul Lee, Seoul (KR); Joohee Moon, Seoul (KR); Haekwang Kim, Seoul (KR); Jungyoup Yang, Seoul (KR); Kwanghyun Won, Gyeonggi-do (KR)

(73) Assignee: SK TELECOM CO., LTD., Seoul (KR)

( * ) Notice: Subject to any disclaimer, the term of this patent is extended or adjusted under 35 U.S.C. 154(b) by 328 days.

(21) Appl. No.: 13/001,599

(22) PCT Filed: Jun. 19, 2009

(86) PCT No.: PCT/KR2009/003291
§ 371 (c)(1),
(2), (4) Date: Mar. 23, 2011

(87) PCT Pub. No.: WO2009/157674
PCT Pub. Date: Dec. 30, 2009

(65) Prior Publication Data
US 2011/0170601 A1 Jul. 14, 2011

(30) Foreign Application Priority Data

Jun. 26, 2008 (KR) .................. 10-2008-0060838

(51) Int. Cl.
*H04N 19/105* (2014.01)
*H04N 19/52* (2014.01)
*H04N 19/46* (2014.01)

(52) U.S. Cl.
CPC ............ *H04N 19/105* (2014.11); *H04N 19/46* (2014.11); *H04N 19/52* (2014.11)

(58) Field of Classification Search
CPC . H04N 7/2676; H04N 7/26861; H04N 7/361; H04N 19/00151; H04N 19/00684
USPC .......................... 375/240.16, 240.17, 240.27
See application file for complete search history.

(56) References Cited

U.S. PATENT DOCUMENTS

2004/0091049 A1* 5/2004 Yamaguchi et al. ..... 375/240.16
2004/0184666 A1 9/2004 Sekiguchi et al.
(Continued)

OTHER PUBLICATIONS

International Search Report mailed Feb. 2, 2010 for PCT/KR2009/003291.

*Primary Examiner* — Andy Rao
*Assistant Examiner* — Jared Walker
(74) *Attorney, Agent, or Firm* — Hauptman Ham, LLP

(57) ABSTRACT

A method for encoding/decoding a motion vector and an apparatus thereof are disclosed. The method includes defining a candidate motion vector set with respect to a current motion vector; selecting a predicted motion vector from the candidate motion vector set; determining a predictability of the predicted motion vector in a decoding apparatus; encoding the current motion vector by using a motion vector prediction mode for indicating the predicted motion vector and the predictability, if the predictability is determined positive; and encoding the current motion vector by using a motion vector prediction mode for indicating a default predicted motion vector and an unpredictability, if the predictability is determined negative. According to the disclosure, it becomes unnecessary to directly notify of the predicted motion vector of the current motion vector to the decoding apparatus, and instead a predetermined shared function is provided to inform of or search the predicted motion vector.

10 Claims, 13 Drawing Sheets

(56) References Cited

U.S. PATENT DOCUMENTS

| | | | |
|---|---|---|---|
| 2005/0053136 A1* | 3/2005 | Yu et al. | 375/240.16 |
| 2006/0109911 A1 | 5/2006 | Jang et al. | |
| 2006/0285596 A1* | 12/2006 | Kondo et al. | 375/240.16 |
| 2007/0081096 A1* | 4/2007 | Klein Gunnewiek et al. | 348/416.1 |
| 2007/0098067 A1 | 5/2007 | Kim et al. | |
| 2007/0110160 A1* | 5/2007 | Wang et al. | 375/240.16 |
| 2008/0049845 A1* | 2/2008 | Liu | 375/240.27 |
| 2008/0165851 A1* | 7/2008 | Shi et al. | 375/240.16 |
| 2008/0181308 A1* | 7/2008 | Wang et al. | 375/240.16 |
| 2009/0304084 A1* | 12/2009 | Hallapuro et al. | 375/240.16 |

\* cited by examiner

METHOD FOR ENCODING/DECODING MOTION VECTOR AND APPARATUS THEREOF

CROSS REFERENCE TO RELATED APPLICATION

This application claims the priority of Korean Patent Application No. 10-2008-0060838, filed on Jun. 26, 2008 in the KIPO (Korean Intellectual Property Office), the disclosure of which is incorporated herein in their entirety by reference. Further, this application is the National Phase application of International Application No. PCT/KR2009/003291, filed Jun. 19, 2009, which designates the United States and was published in Korean. Each of these applications is hereby incorporated by reference in their entirety into the present application.

TECHNICAL FIELD

The present disclosure relates to a video encoding/decoding. More particularly, the present disclosure relates to a method for encoding/decoding motion vectors in the video encoding/decoding and an apparatus thereof.

BACKGROUND ART

The statements in this section merely provide background information related to the present disclosure and may not constitute prior art.

As multimedia technologies are developed in rapid progress, demand for quality multimedia data including audio, image, and video is increased. Accordingly, for meeting the demand to transmit, store, and retrieve such multimedia data within limited network resources, international standards are being set up for high efficiency video compressions. Specifically, in case of videos, ISO/IEC JTC1/SC29MPEG group and ITU-T VCEG group have created H.264/AVC MPEG-4 Part. 10 standard, which attempts to achieve a high compression efficiency by using various prediction encoding methods such as variable block size motion estimation and compensation, intra prediction encoding, etc. The prediction encoding is an effective method to reduce correlations in existence between data and it is widely used for compressing various types of data. Because a motion vector especially has a high correlation with an adjacent blocks' motion vector, it is possible to first calculate a prediction or a predicted motion vector (PMV) for a motion vector of a current block by using its adjacent block's motion vector and then encode not the true value of the motion vector of the current block but just a differential motion vector (DMV: also called "residual signal", "differential value") relative to the prediction value and thereby substantially reduce the bit quantity to improve the coding efficiency.

Generally, for the purpose of an effective compression in the encoding of a motion vector using such a predicted motion vector, more accurately predicted motion vector proportionally improves the coding efficiency. Therefore, a possible way of improving the efficiency of the predicted encoding is not only to involve the spatially adjacent blocks' motion vectors but also to generate a finite number of predicted motion vector comprising temporally, spatially, or spatio-temporally adjacent blocks' motion vectors or different calculated motion vectors from their combinations and use the most appropriate selection therefrom for the predicted encoding of the motion vectors. In this occasion, to correctly reconstruct the original motion vector from the prediction based encoded motion vectors, it is necessary to know which one of the finite number of the predicted motion vector was used. The simplest prediction encoding method of motion vector for the task is to additionally encode information on the correct predicted value used to perform the prediction encoding of the motion vectors. Alternatively, to save generating a bit quantity required to indicate such selection of the predicted motion vector, current H.264/AVC standard uses medians of respective horizontal components and each vertical component of the motion vectors contained in the adjacent blocks (at left, upper, upper right side of current block) as the predicted motion vector for the predicted encoding of the motion vectors. This method determines a commonly recognized predetermined default means of the median in encoding/decoding and thereby produces the prediction value (predicted motion vector), obviating the need for additionally encoding information on which predicted value was used. The conventional method of preparing the predefined default means of the median is only as good as saving an additional information transmission about identifying a motion vector used as the predicted motion vector, but still deficient because the predicted motion vector that is actually the median is not the best predicted motion vector to minimally generate the bit quantity required for encoding the differential motion vector.

DISCLOSURE

Technical Problem

In order to solve the above described problem, the present disclosure uses multiple motion vector prediction modes to allow a more accurate selection of a predicted motion vector of the current motion vector and thereby reduces the bit quantity of encoding the differential motion vector so as to improve the motion prediction and/or motion compensation performances.

Additionally, the disclosure seeks to improve the coding efficiency by allowing the selection of more accurate predicted motion vector and further improve the decoding as well as the encoding efficiency by giving identifying information for the predicted motion vector to the decoding apparatus or sharing an identifying function therefor with the decoding apparatus to avoid the increase of the coding bit quantity of additional information to identify the predicted motion vector.

Technical Solution

An aspect of the present disclosure provides a method for encoding a motion vector including: defining a candidate motion vector set with respect to a current motion vector of a current block; selecting a predicted motion vector from the defined candidate motion vector set; determining a predictability of the selected predicted motion vector in a decoding apparatus; encoding the current motion vector by using a motion vector prediction mode for indicating the selected predicted motion vector and the predictability, if the step of determining the predictability turns out positive; and encoding the current motion vector by using a motion vector prediction mode for indicating a preset default predicted motion vector and an unpredictability, if the step of determining the predictability turns out negative.

Another aspect of the present disclosure provides a method for decoding a motion vector including: decoding an encoded motion vector prediction mode and an encoded differential vector; determining whether the decoded motion vector prediction mode indicates a predictability or an unpredictability;

if the decoded motion vector prediction mode indicates the predictability, defining a set of candidate motion vectors made available to select a predicted motion vector for reconstructing a current motion vector of a current block, selecting one candidate motion vector in the defined candidate motion vector set, and determining the selected one candidate motion vector as a predicted motion vector of the current motion vector; if the decoded motion vector prediction mode indicates the unpredictability, determining the preset default predicted motion vector as the predicted motion vector of the current motion vector; and adding the decoded differential vector to the predicted motion vector determined in the step of determining the selected one candidate motion vector or the step of determining the preset default predicted motion vector as the predicted motion vector of the current motion vector so as to reconstruct the predicted motion vector of the current motion vector.

Yet another aspect of the present disclosure provides an apparatus for encoding a motion vector including: a predicted motion vector selector for defining a set of candidate motion vectors with respect to a current motion vector of a current block and selecting a predicted motion vector from the defined candidate motion vector set; a prediction mode determiner for determining a predictability of the selected predicted motion vector in a decoding apparatus and deciding a motion vector prediction mode for indicating either the predictability or an unpredictability depending on the determining; a first encoder responsive to the decided motion vector prediction mode being indicative of the predictability for determining the selected predicted motion vector as a predicted motion vector of the current motion vector and for encoding the current motion vector by using a differential vector between the current motion vector and the selected predicted motion vector and the decided motion vector prediction mode; and a second encoder responsive to the decided motion vector prediction mode being indicative of the unpredictability for determining a preset default predicted motion vector as the predicted motion vector of the current motion vector and for encoding the current motion vector by using a differential vector between the current motion vector and the preset default predicted motion vector and the decided motion vector prediction mode.

Yet another aspect of the present disclosure provides an apparatus for decoding a motion vector including: a decoder for decoding an encoded motion vector prediction mode and an encoded differential vector from an encoding apparatus; a prediction mode determiner for determining whether the decoded motion vector prediction mode indicates a predictability or an unpredictability; a first predicted motion vector determiner responsive to the decoded motion vector prediction mode being indicative of the predictability for defining a set of candidate motion vectors made available to select a predicted motion vector for reconstructing a current motion vector of a current block, selecting a predicted motion vector in the defined candidate motion vector set, and determining the selected predicted motion vector as a predicted motion vector of the current motion vector; a second predicted motion vector determiner responsive to the decoded motion vector prediction mode being indicative of the unpredictability for determining a preset default predicted motion vector as the predicted motion vector of the current motion vector; and a reconstructor for reconstructing the current motion vector of the current block by adding the decoded differential vector to the predicted motion vector determined in the first predicted motion vector determiner or the second predicted motion vector determiner.

Yet another aspect of the present disclosure provides a method for encoding a motion vector including: selecting a predicted motion vector of a current motion vector in accordance to a selected motion vector prediction mode among of multiple motion vector prediction modes; encoding a differential vector between the current motion vector and the predicted motion vector; encoding the motion vector prediction mode information for indicating the selected motion vector prediction mode; and generating a bitstream containing the encoded differential vector and the motion vector prediction mode information.

Yet another aspect of the present disclosure provides a method for decoding a motion vector including: decoding a differential vector between a current motion vector and its predicted motion vector and motion vector prediction mode information of the current motion vector; selecting the predicted motion vector of the current motion vector based on the motion vector prediction mode information; and reconstructing the current motion vector by using the selected predicted motion vector.

Advantageous Effects

As described above, the present disclosure uses multiple motion vector prediction modes to allow a more accurate selection of a predicted motion vector of the current motion vector and thereby reduces the bit quantity of encoding the differential motion vector so as to improve the motion prediction and/or motion compensation performances.

In addition to the improved coding efficiency by allowing the selection of more accurate predicted motion vector, the disclosure improves the decoding as well as the encoding efficiency by giving search information for the predicted motion vector to the decoding apparatus or sharing an identifying function therefor with the decoding apparatus to avoid the increase of the coding bit quantity of additional information to identify the predicted motion vector.

DESCRIPTION OF DRAWINGS

The drawings described herein are for illustration purposes only and are not intended to limit the scope of the present disclosure in any way.

MODE FOR INVENTION

Figure 1:
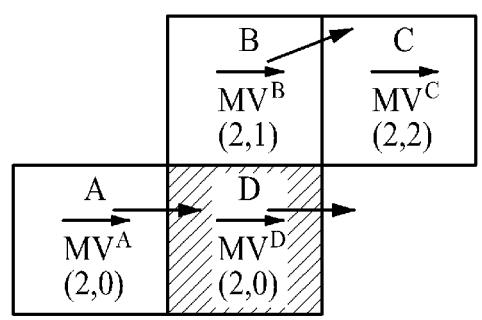
FIG. 1 is an exemplary diagram showing blocks with motion vectors to be encoded according to an aspect.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

FIG. 1 is an exemplary diagram showing blocks with motion vectors to be encoded according to an aspect.

In FIG. 1, for example, block D is a "current block" corresponding to the motion vector to be encoded, and blocks A, B, and C are "adjacent blocks" with respect to block D.

Referring to FIG. 1, $MV^A$, $MV^B$, $MV^C$, and $MV^D$ are motion vectors (MV) contained in blocks A, B, C, and D, and they are respectively defined as having horizontal components ($MV^A_x$, $MV^B_x$, $MV^C_x$, and $MV^D_x$) and vertical components ($MV^A_y$, $MV^B_y$, $MV^C_y$, and $MV^D_y$). Here, the motion vector $MV^D$ of the current block, block D is called "current motion vector".

Referring again to FIG. 2, current motion vector $MV^D$ is (2, 0), and the adjacent blocks' motion vectors $MV^A$, $MV^B$, and $MV^C$ are respectively (2, 0), (2, 1), and (2, 2), for example.

A predicted motion vector $PMV^D$ for the current motion vector of current block D is calculated as in Equation 1 below, and the predicted motion vector $PMV^D$ is defined as having a horizontal component $PMV^D_x$ and a vertical component $PMV^D_y$.

$$PMV^D = \begin{bmatrix} PMV^D_x \\ PMV^D_y \end{bmatrix} = \begin{bmatrix} F(MV^A_x, MV^B_x, MV^C_x) \\ F(MV^A_y, MV^B_y, MV^C_y) \end{bmatrix} \quad \text{Equation 1}$$

Reviewing Equation 1, it can be seen that predicted motion vector $PMV^D$ for the current motion vector is calculated with motion vectors $MV^A$, $MV^B$, and $MV^C$ of adjacent blocks A, B, and C used as variables of a particular function (F( )).

In H.264/AVC standard, predicted motion vector $PMV^D$ for the current motion vector is calculated with a function for calculating a median used as the particular function (F( )). In other words, predicted motion vector $PMV^D$ for the current motion vector is obtained as the median of motion vectors $MV^A$, $MV^B$, and $MV^C$ of adjacent blocks A, B, and C. Predicted motion vector $PMV^D$ for the current motion vector $MV^D$ is expressed as Equation 2 below.

$$PMV^D = \begin{bmatrix} PMV^D_x \\ PMV^D_y \end{bmatrix} = \begin{bmatrix} \text{median}(MV^A_x, MV^B_x, MV^C_x) \\ \text{median}(MV^A_y, MV^B_y, MV^C_y) \end{bmatrix} \quad \text{Equation 2}$$

If the predicted motion vector $PMV^D$ of the current motion vector $MV^D$ is obtained by using Equation 1 (or Equation 2), then Equation 3 may be used to obtain a differential motion vector $DMV^D$ (also called 'motion vector residual signal') generated by the operation of difference on predicted motion vector $PMV^D$ from its current motion vector $MV^D$ desired to be compressed, and differential motion vector $DMV^D$ is then encoded by a predefined method such as an entropy encoding for transmission.

$$DMV^D = MV^D - PMV^D = \begin{bmatrix} MV^D_x - PMV^D_x \\ MV^D_y - PMV^D_y \end{bmatrix} \quad \text{Equation 3}$$

As illustrated in FIG. 1, if the current motion vector $MV^D$ is valued (2, 0) and if Equation 2 is used to conventionally calculate the median as predicted motion vector, its predicted motion vector $PMV^D$ becomes (2, 1).

Such use of the median as the predicted motion vector lets both the encoding apparatus and decoding apparatus have the common self-knowledge to obviate the existing needs to encode and transmit 'additional information' on the identification of a motion vector used as the predicted motion vector of the current motion vector, and hence improves the encoding efficiency.

But, as noted above, predicted motion vector $PMV^D$ calculated by using the median may differ from the original current motion vector $MV^D$. Considering the example of FIG. 1, the predicted motion vector $PMV^D$ (2, 1) calculated by using the median is different from current motion vector $MV^D$ of (2, 0), and an attempt to use Equation 3 for differential motion vector $DMV^D$ will yield differential motion vector to be encoded of $DMV^D$ that is (0, −1).

Instead, if the block A's motion vector $MV^A$ of (2, 0) is used as predicted motion vector $PMV^D$, there is no difference occurred with respect to the original current motion vector $MV^D$, and executing Equation 3 for differential motion vector $DMV^D$ will yield differential motion vector $DMV^D$ to be encoded that is (0, 0).

In other words, compared with using the median to have predicted motion vector $PMV^D$ calculated as (2, 1), applying the block A's motion vector $MV^A$ of (2, 0) as predicted motion vector $PMV^D$ to have differential motion vector $DMV^D$ of (0, 0) can effectively reduce the bit quantity needed to encode the same.

As in this comparison, the required use of the median as predicted motion vector precludes the possibility of adopting the block A's motion vector $MV^A$ for use as predicted motion vector $PMV^D$.

Even if it the block A's motion vector $MV^A$ is available for that purpose, it would be necessary to prepare and deliver 'extra information' on which one of motion vectors $MV^A$, $MV^B$, and $MV^C$ is used as predicted motion vector $PMV^D$ which counteracts the efforts to secure a better compression efficiency.

In views of this, an aspect of the present disclosure uses multiple motion vector prediction modes to enable a selection of predicted motion vector with an increased accuracy, and thereby resolves the existing problems associated with using the median as the predicted motion vector.

In addition, not only the motion vector encoding method according to an aspect improves the encoding efficiency through selecting more accurate predicted motion vector, it also suggests to inform the decoding apparatus of the selected predicted motion vector in an effective way to avoid the ensuing increase of the encoding bit quantity.

Throughout the following description, blocks A, B, C, D and their respective motion vectors $MV^A$, $MV^B$, $MV^C$, and $MV^D$ will be used.

Although motion vectors $MV^A$, $MV^B$, $MV^C$, and $MV^D$ are conveniently depicted as 2-dimensional vectors with their vertical and horizontal components, it is not self-limiting. Specifically, the motion vector encoding/decoding of the disclosure is readily applicable to n-dimensional motion vectors. In addition, the depiction of FIG. 1 uses only three spatially adjacent blocks A, B, and C with respect to the current block at D although there may be one or more temporally or spatially adjacent blocks in their places within the disclosure.

The process to achieve the stated solutions according to a motion vector encoding method of an aspect will be detailed below.

In accordance with an aspect, the motion vector prediction modes include a default prediction mode and a non-default prediction mode. In the following descriptions, the default prediction mode is an example negative prediction mode to indicate that a selected predicted motion vector (optimally predicted motion vector) according to a predetermined criteria or method is not predictable. To the contrary, the non-default prediction mode is an example positive prediction mode to indicate that the selected predicted motion vector (optimally predicted motion vector) according to the predetermined criteria or method is predictable. The "optimally predicted motion vector" herein is just to name the current vector's predicted motion vector obtained following the predetermined criteria or method and it is not to say so obtained predicted motion vector is an always optimum predicted value.

Figure 2:
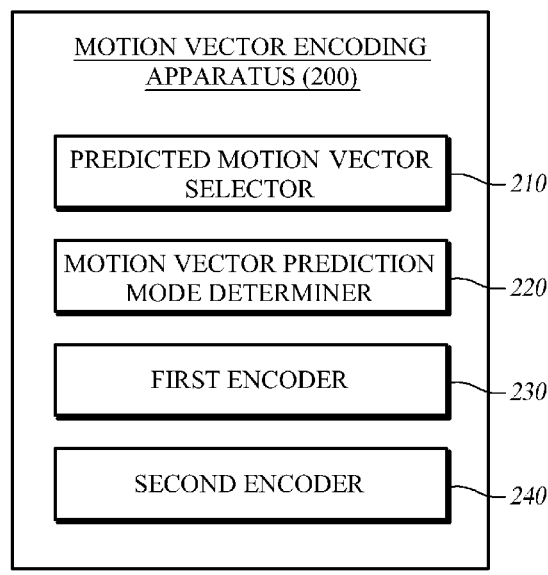
FIG. 2 is a block diagram showing a motion vector encoding apparatus according to an aspect.

FIG. 2 is a block diagram showing a motion vector encoding apparatus 200 according to an aspect.

Referring to FIG. 2, motion vector encoding apparatus 200 includes a predicted motion vector selector 210, a motion vector prediction mode determiner 220, a first encoder 230, and a second encoder 240. However, motion vector encoding apparatus 200 may be simply called as an encoding apparatus.

Predicted motion vector selector 210 defines a set of candidate motion vectors for use as predicted motion vectors with respect to a current motion vector of a current block and selects a predicted motion vector from the defined candidate motion vector set. For example, it is possible to select as the predicted motion vector a candidate motion vector to minimize the difference form the current motion vector out of the candidate motion vector set. In this regard, the predicted motion vector selected from the candidate motion vector set in predicted motion vector selector 210 will be conveniently referred to as an optimally predicted motion vector hereinafter. To repeat, the optimally predicted motion vector is by name only to present a specific example of the current vector's predicted motion vector that is practically obtained following the predetermined criteria or method.

Motion vector prediction mode determiner 220 determines a predictability of the optimally predicted motion vector selected in predicted motion vector selector 210 and decides a "motion vector prediction mode" for indicating either the predictability or unpredictability depending on the final determination.

First encoder 230, in response to the decided motion vector prediction mode in motion vector prediction mode determiner 220 indicating the predictability, determines the "optimally predicted motion vector" selected in predicted motion vector selector 210 as a predicted motion vector of the current motion vector, calculates a differential vector between the current motion vector and the optimally predicted motion vector, and encodes the current motion vector by using the calculated differential vector and a "motion vector prediction mode for indicating the predictability".

Second encoder 240, in response to the decided motion vector prediction mode in motion vector prediction mode determiner 220 indicating the unpredictability, determines a preset "default predicted motion vector" that it shares its knowledge with a decoding apparatus as the predicted motion vector of the current motion vector, calculates a differential vector between the current motion vector and the preset default predicted motion vector, and encodes the current motion vector by using the calculated differential vector and a "motion vector prediction mode for indicating the unpredictability". Here, the "default predicted motion vector" is comparable to the "optimally predicted motion vector" and represents the predicted motion vector preset between the encoding and decoding apparatuses and it may be a median of adjacent blocks' motion vector.

The decided motion vector prediction mode in motion vector prediction mode determiner 220 and the differential vector encoded by first encoder 230 or second encoder 240 is inserted in a bitstream for transmission. The bitstream for transmission is delivered through transmission channels of wired, wireless, or storage media to a decoder side where it is decoded by a motion vector decoding apparatus as will be described below.

Referring to FIG. 2 and further to FIGS. 4 to 10, a detailed description on a motion vector encoding method to be performed by motion vector encoding apparatus 200 will be provided herein.

Figure 3:
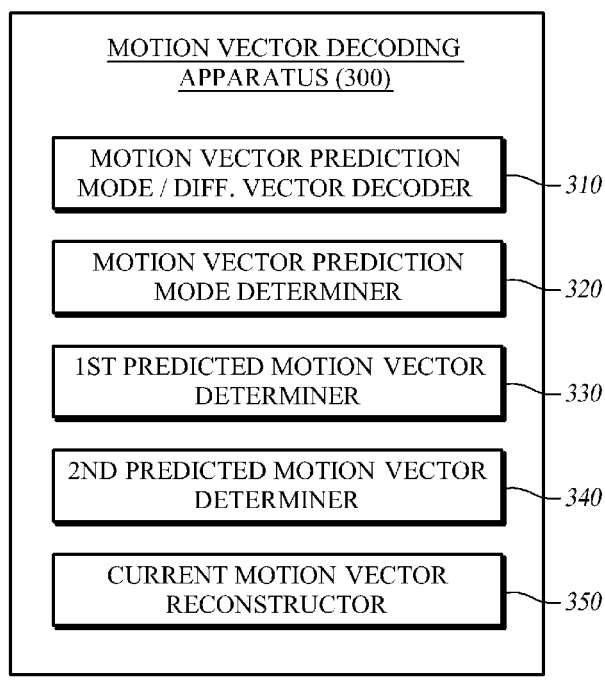
FIG. 3 is a block diagram showing a motion vector decoding apparatus according to an aspect.

FIG. 3 is a block diagram showing a motion vector decoding apparatus 300 according to an aspect.

As illustrated, motion vector decoding apparatus 300 includes a motion vector prediction mode/differential vector decoder 310, a motion vector prediction mode determiner 320, a first predicted motion vector determiner 330, a second predicted motion vector determiner 340, and a current motion vector reconstructor 350.

Motion vector prediction mode/differential vector decoder 310 decodes an encoded motion vector prediction mode and an encoded differential vector from encoding apparatus 200.

Motion vector prediction mode determiner 320 determines whether the decoded motion vector prediction mode indicates a predictability or an unpredictability.

First predicted motion vector determiner 330, in response to the decoded motion vector prediction mode indicating the predictability, defines a set of candidate motion vectors made available to select a predicted motion vector for reconstructing a current motion vector of a current block, and selects the "optimally predicted motion vector" in the defined candidate motion vector set, and determines the selected optimally predicted motion vector as a predicted motion vector of the current motion vector.

Second predicted motion vector determiner 340, in response to the decoded motion vector prediction mode indicating the unpredictability, determines a preset "default predicted motion vector" that it shares its knowledge with decoding apparatus 200 as the predicted motion vector of the current motion vector a preset default predicted motion vector as the predicted motion vector of the current motion vector.

Current motion vector reconstructor 350 reconstructs the current motion vector of the current block by adding the decoded differential vector to the predicted motion vector determined in first predicted motion vector determiner 330 or second predicted motion vector determiner 340.

Figure 11:
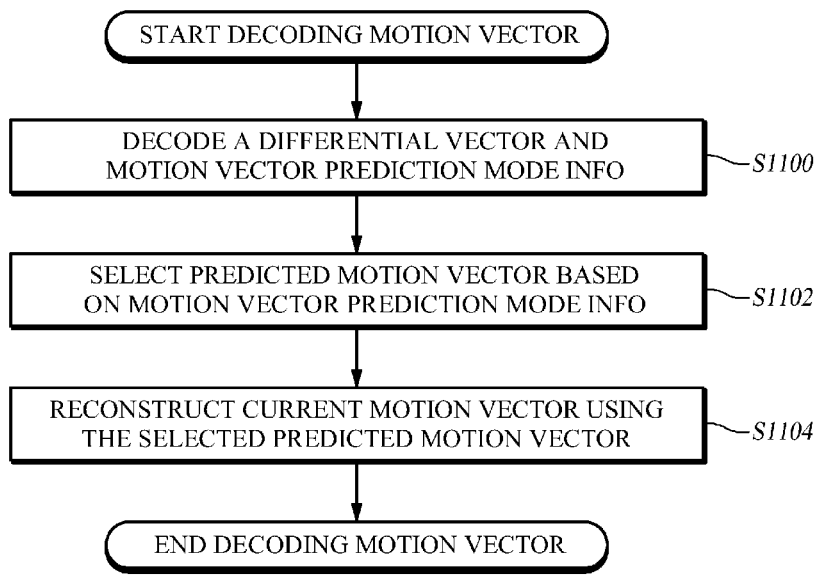
FIG. 11 is a schematic flow diagram showing a motion vector decoding method according to an aspect.
Figure 12:
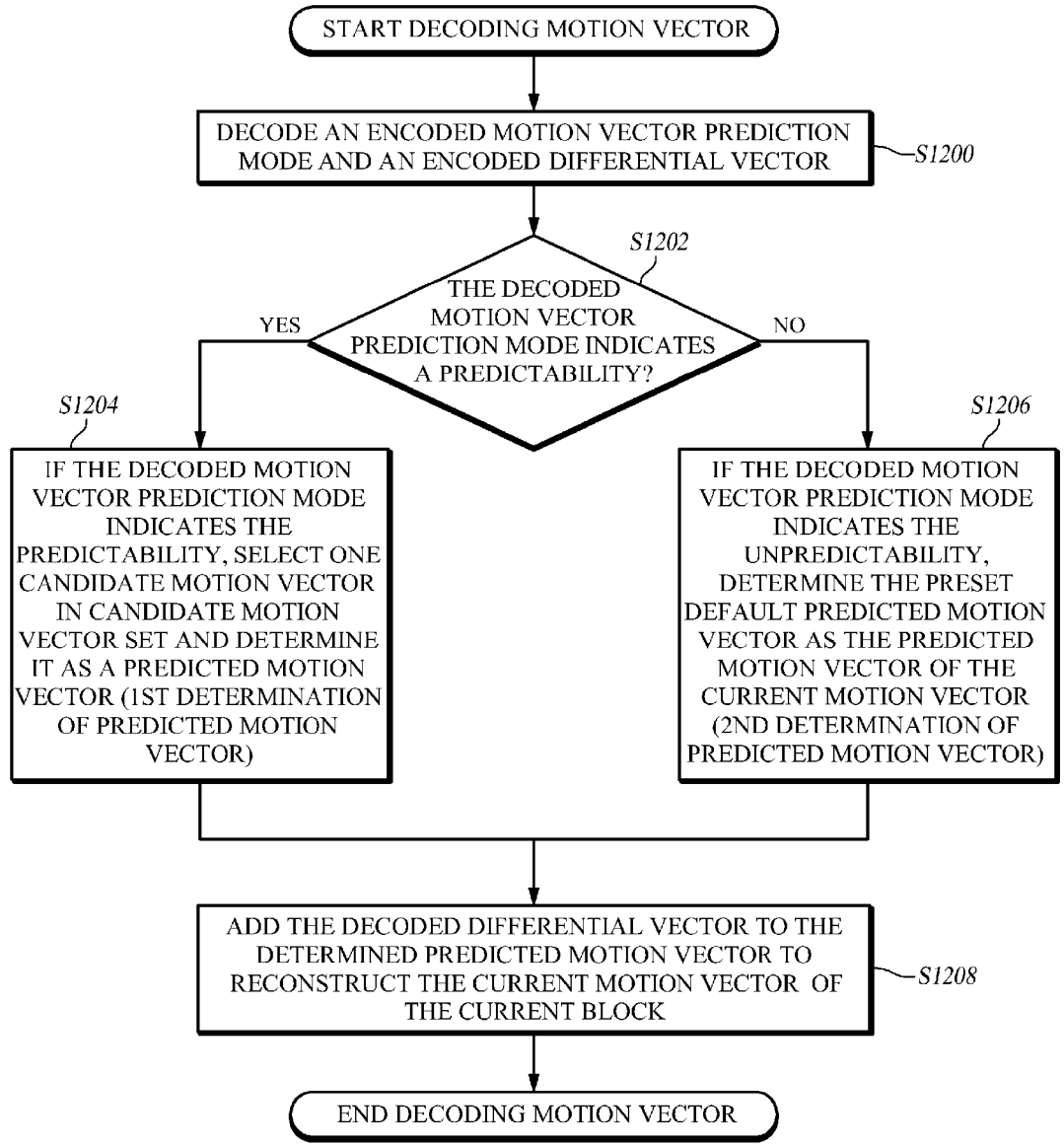
FIG. 12 is a detailed flow diagram showing a motion vector decoding method according to an aspect.
Figure 13:
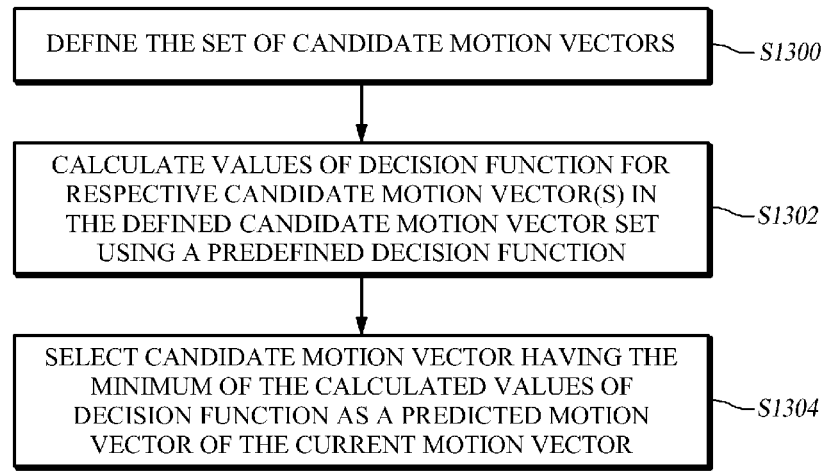
FIG. 13 is a flow diagram showing a first selection step of a predicted motion vector in a motion vector decoding method according to an aspect.

Referring to FIG. 3 and further to FIGS. 11 to 13, a detailed description on a motion vector decoding method to be performed by motion vector decoding apparatus 300 will be provided herein.

Figure 4:
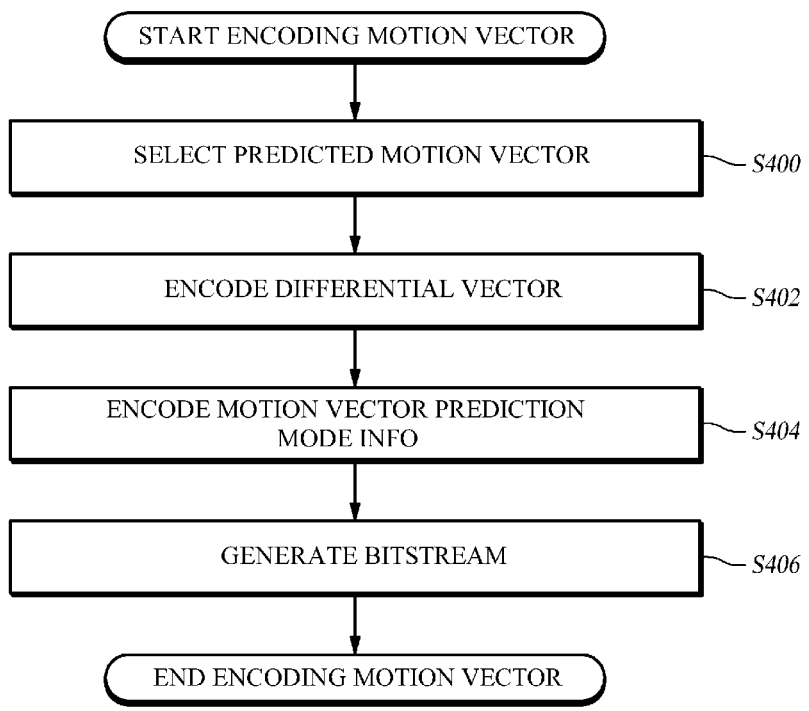
FIG. 4 is a schematic flow diagram showing a motion vector encoding method according to an aspect.

FIG. 4 is a schematic flow diagram showing a motion vector encoding method according to an aspect.

Referring to FIG. 4, the motion vector encoding method includes selecting a predicted motion vector of a current motion vector in accordance to a motion vector prediction mode selected from multiple motion vector prediction modes in step S400; encoding a differential vector between the current motion vector and the predicted motion vector in step S402; encoding motion vector prediction mode information for indicating the defined motion vector prediction mode in step S404; and generating a bitstream containing the encoded differential vector and the motion vector prediction mode information in step S406.

The "multiple motion vector prediction modes" described above implies that they are classified based on whether a decoding apparatus can predict different predicted motion vectors from a preset default predicted motion vector. These multiple motion vector prediction modes may includes a non-default prediction mode and a default prediction mode.

If the decoding apparatus cannot predict other predicted motion vectors than a preset default predicted motion vector, the motion vector prediction mode in this instance is called "default prediction mode". In addition, if the decoding apparatus can predict other predicted motion vectors than a preset default predicted motion vector, the motion vector prediction mode in this instance is called "non-default prediction mode".

If the selected motion vector prediction mode is the default prediction mode, step S400 selects the preset default predicted motion vector as the predicted current motion vector of the current motion vector.

If the selected motion vector prediction mode is the non-default prediction mode, the same step S400 selects one of multiple candidate motion vectors as the predicted current motion vector (optimally predicted motion vector) of the current motion vector by using a predetermined method.

However, though FIG. 4 depicts the steps of S400, S402, S404, and S406 as performed in the numerical sequence, it is merely to discuss the intrinsic characteristics of the disclosure and their sequence may be switched without departing from the characteristics. For example, step S402 in FIG. 4 may follow step S404 as different from the illustration that step S402 precedes step S404. In other word, any sequences are allowable.

Referring to FIG. 4 and further to FIGS. 5 to 10, a detailed description on a motion vector encoding method will follow.

Figure 5:
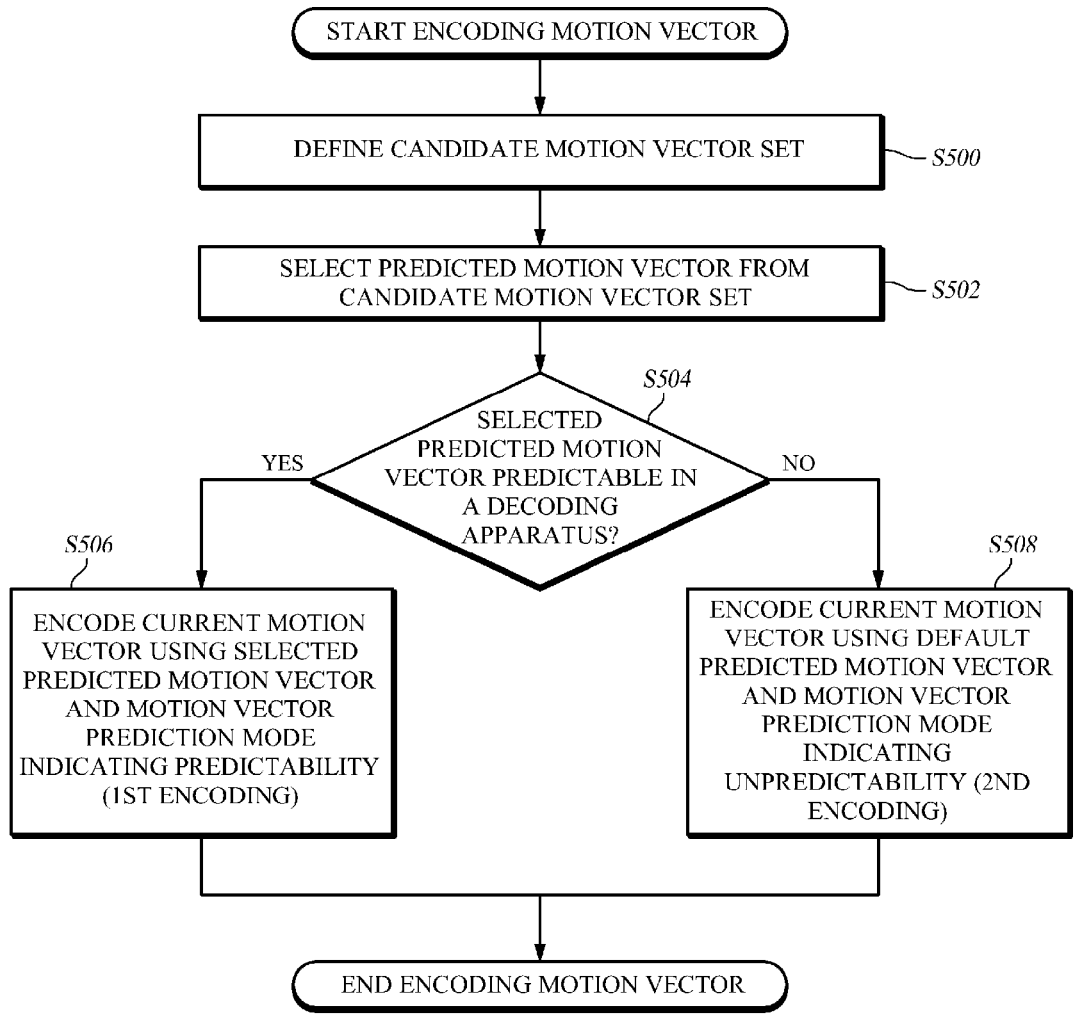
FIG. 5 is a detailed flow diagram showing a motion vector encoding method according to an aspect.

FIG. 5 is a detailed flow diagram showing a motion vector encoding method according to an aspect.

Referring to FIG. 5, the method for encoding a motion vector includes defining a candidate motion vector set in step S500, selecting a predicted motion vector in step S502, determining a predictability of the predicted motion vector in step S504, a first encoding step S506, and a second encoding step S508.

Step S500 of defining a candidate motion vector set defines the candidate motion vector set with respect to a current motion vector of a current block.

Step S502 of selecting a predicted motion vector selects an optimally predicted motion vector from the defined candidate motion vector set.

Step S504 for determining a predictability of the predicted motion vector determines if the selected optimally predicted motion vector candidate is predictable in a decoding apparatus.

First encoding step S506 encodes the current motion vector by using a motion vector prediction mode for indicating the selected optimally predicted motion vector and the predictability, if step S504 for determining the predictability turns out positive.

Second encoding step S508 encodes the current motion vector by using a motion vector prediction mode for indicating a preset default predicted motion vector and unpredictability, if step S504 for determining the predictability turns out negative.

The finally decided motion vector prediction mode and the differential vector encoded by first encoding step S506 or second encoding step S508 is inserted in a bitstream for transmission. The bitstream for transmission is delivered through transmission channels of wired, wireless, or storage media to a decoder side.

The above steps S500, S502, S504, S506, and S508 will be described in detail referring to FIGS. 6, 7, 8, 9, and 10.

Figure 6:
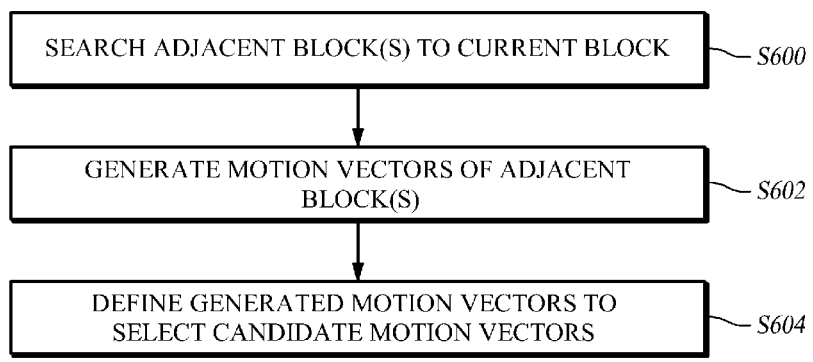
FIG. 6 is a flow diagram showing a step of selecting a candidate motion vector in a motion vector encoding method according to an aspect.

FIG. 6 is a flow diagram showing step S500 for selecting a candidate motion vector in a motion vector encoding method according to an aspect.

Referring to FIG. 6, step S500 of defining a candidate motion vector set in the motion vector encoding method of an aspect includes searching one or more adjacent blocks to the current block in step S600, generating motion vectors of the searched one or more adjacent blocks, respectively in step S602, and defining the respectively generated motion vectors as candidates for selecting a set of the candidate motion vectors in step S604.

Referring to the example of FIG. 1, the defined candidate motion vector set in step S500 of defining a candidate motion vector set becomes $\{MV^A, MV^B, MV^C\}$ consisting of the motion vectors of adjacent blocks A, B, and C, which are positioned at left, upper, and upper right sides, respectively.

However, more generally, the candidate motion vector set may be provided by more diverse motion vectors depending on the implementations and as desired. For example, the candidate motion vector set may be of the motion vectors of the blocks located at the same locations but in the temporally past picture or the blocks spatially located at the upper left side of the current block. In addition, these motion vectors may be used to define other motion vectors (such as an average or median of several motion vectors) for use as the elements in the candidate motion vector set.

Therefore, step S600 for searching adjacent blocks may search one or both adjacent blocks among one or more first blocks located in temporally past and future pictures at the same location as the current block and one or more second blocks spatially located adjacent to the current block.

In addition, step S602 for generating motion vectors of the searched adjacent block(s) may generate as the motion vector one of the respective motion vectors in the one or more first blocks, the respective motion vectors in the one or more second blocks, and an average value or median of one or more of the respective motion vectors in the first and the second blocks.

The candidate motion vector set may be defined in diverse ways on the assumption that both the encoding apparatus 200 and the decoding apparatus 300 have prior knowledge of its definition. Additionally, in the case where the component candidate motion vectors of the candidate motion vector set are equally valued in part or in their entirety, the set may be rearranged to include only the candidate motion vectors valued differently.

Figure 7:
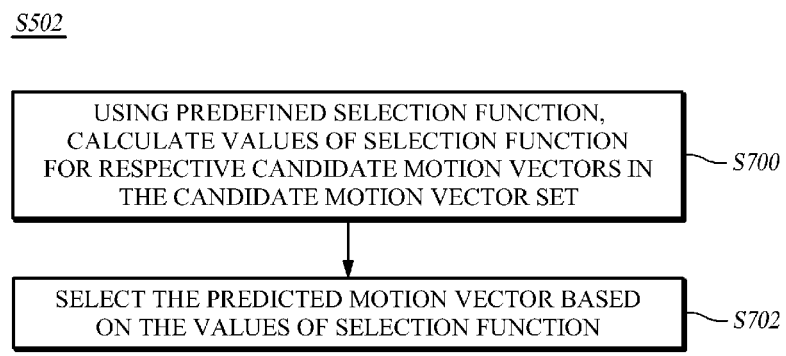
FIG. 7 is a flow diagram showing a step of selecting a predicted motion vector in a motion vector encoding method according to an aspect.

FIG. 7 is a flow diagram showing step S502 for selecting a predicted motion vector in the motion vector encoding method according to an aspect.

Referring to FIG. 7, step S502 for selecting a predicted motion vector includes calculating values of selection function for the one or more respective candidate motion vectors included in the defined candidate motion vector set by using a predefined selection function in step S700 and selecting the predicted motion vector from the one or more candidate motion vectors based on the calculated values of selection function in step S702.

As an example, the "values of selection function" may include one or more combinations of a bit quantity required for encoding a differential motion vector of the one or more respective candidate motion vectors included in the defined candidate motion vector set against the current motion vector, the magnitude of the differential motion vector of the one or more respective candidate motion vectors included in the defined candidate motion vector set against the current motion vector, and a bit quantity required to encode the motion vector prediction mode.

With the bit quantity of the differential vector used as the selection function, step S702 described above, for an example, may calculate the bit quantity required to encode the differential vector respectively for the one or more candidate motion vectors in the defined candidate motion vector set and select the candidate motion vector having the least or minimum of the calculated bit quantity as the optimally predicted motion vector.

As an alternative to the selection method for optimally predicted motion vector based on the bit quantity as the selection function, step S502 for selecting the predicted motion vector in the motion vector encoding method may select the optimally predicted motion vector by using rate-distortion optimization, which simultaneously considers the required bit rate for encoding when a motion vector is selected from the candidate motion vector(s) included in the defined candidate motion vector set and the subsequent quality of the reconstructed video.

Step S502 for selecting the predicted motion vector may use Lagrangian cost function found in Equation 4 below as the selection function for selecting the optimally predicted motion vector.

$$J(n,k)=D(n,k)+\lambda S[R_H(n,k)+R_M(n,k)]$$  Equation 4

Here, J is Lagrangian cost, D is the difference between the original image and the reconstructed image, λ is Lagrangian multiplier. $R_H$ is the bit quantity required to encode the motion vector prediction mode, $R_M$ is the bit quantity required to encode the differential vector of the current motion vector. In Equation 4, J, D, $R_H$, $R_M$ are all defined by n for representing the picture number where the current block is and k for representing the block number. Therefore, the present disclosure may be selectively applied in units of a picture or a block.

In addition, during the selection of the optimally predicted motion vector, if there is no change of the error D between the original image and reconstructed image or an easier calculation is desired, out of Equation 4 calculation for Lagrangian cost J it is allowable to delete D and λ for simplification.

In the course of calculating Lagrangian cost generated by the motion vector encoding method, $R_H$ in Equation 4 is the bit quantity required to encode the motion vector prediction mode and $R_M$ is the bit quantity for the differential vector against the encoded current motion vector, and their calculation methods change by the motion vector prediction modes. Specifically, if the motion vector prediction mode indicates unpredictability for the (optimally) predicted motion vector by decoding apparatus 300, $R_M$ becomes the bit quantity required to encode the differential vector of the current motion vector against such predicted motion vector generated by a predefined default method such as a median calculation (as is called "default predicted motion vector" or "default prediction value"). In addition, if the motion vector prediction mode indicates predictability for the optimally predicted motion vector by decoding apparatus 300, $R_M$ becomes the bit quantity required to encode the differential vector (differential value) between the selected optimally predicted motion vector and the current motion vector.

Further, besides selecting the optimally predicted motion vector using Lagrangian cost function in Equation 4, step S502 for selecting the predicted motion vector may use Equation 5 below containing more generalized selection functional formula for the same purpose. However, Equation 5 is expressed with the current motion vector of the current block assumed to be motion vector $MV^D$ of block D in FIG. 1.

$$PMV_{enc} = \underset{PMVC \in CS}{\operatorname{argmin}} h(PMVC \mid MV^D)$$  Equation 5

In Equation 5, $PMV_{enc}$ is the selected optimally predicted motion vector and PMVC represents an element (motion vector) belonging to a set of candidate motion vectors (CS) made available to select a predicted motion vector of current motion vector $MV^D$. "h( )" is a selection function for selecting the optimal predicted motion vector to perform the difference operation on the current motion vector $MV^D$ and encode the result.

An example of the selection function h( ) for use may be either the bit quantity required to perform the difference operation on the current motion vector and encode the result or the sum of the required bit quantity for the difference operation of the current motion vector and encoding its result and the required bit quantity for encoding the motion vector prediction mode. In addition, for the sake of a simplified calculation, the actually required bit quantity may be replaced by the size of differential vector (residual signal), i.e. the difference between the current motion vector and the predicted motion vector. More generally, assuming both encoding apparatus 200 and decoding apparatus 300 have prior knowledge of the definition of the selection function ho, it can be variably defined for application. With such selection function h( ) given, it is possible to select one candidate motion vector PMVC to optimize the selection function h( ) from the candidate motion vector set CS that includes the candidate motion vectors for the predicted motion vector, as the optimally predicted motion vector $PMV_{enc}$.

Figure 8:
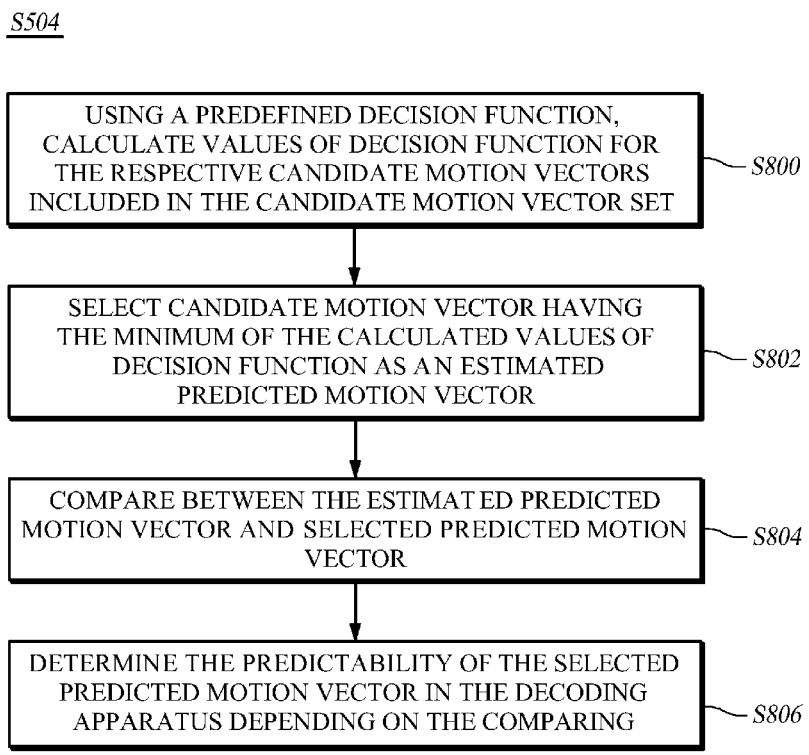
FIG. 8 is a flow diagram showing a step of determining the predictability of a predicted motion vector in a motion vector encoding method according to an aspect.

FIG. 8 is a flow diagram showing step S504 for determining the predictability of a predicted motion vector in the motion vector encoding method according to an aspect.

Referring to FIG. 8, step S504 for determining the predictability of the selected predicted motion vector includes calculating values of decision function for the one or more respective candidate motion vectors included in the defined candidate motion vector set by using a decision function predefined between encoding apparatus 200 and decoding apparatus 300 in step S800, selecting an estimated predicted motion vector for the current motion vector by selecting one from the one or more candidate motion vectors based on the calculated values of decision function in step S802, comparing between the selected estimated predicted motion vector and the selected predicted motion vector in step S804, and determining the predictability of the selected predicted motion vector in decoding apparatus 300 depending on the comparison in step S806.

Step S504 for determining the predictability of a predicted motion vector may be explained again mathematically using Equation 5 as follows.

Step S504 for determining the predictability of a predicted motion vector uses the differential vector (residual signal) calculated with selected optimally predicted motion vector $PMV_{enc}$ in the preceding step S502 for selecting the predicted motion vector, a finite number of candidate motion vectors available to become the candidates for the predicted motion vector, reference picture data for use in the motion compensation, previously reconstructed adjacent block information, and motion compensated residual signal for pixel value, to determine whether the previously selected optimally predicted motion vector in step S502 is predictable by decoding apparatus 300 or the decoding method.

To this end, decoding apparatus 300 first uses differential vector $DMV^D (=MD^D - PMV_{enc})$ against current motion vector $MV^D$ to be calculated and transmitted by encoding apparatus 200, previously reconstructed adjacent block information, and reference picture data for use in motion compensating, to search estimated predicted motion vector $PMV_{dec}$ in a predetermined method of determination such as Equation 6 below.

$$PMV_{dec} = \operatorname*{argmin}_{PMVC \in CS} g(PMVC \mid DMV^D) \qquad \text{Equation 6}$$
$$= \operatorname*{argmin}_{PMVC \in CS} g(PMVC \mid MV^D - PMV_{enc})$$

In Equation 6, decision function go is to let encoding apparatus 200 know if decoding apparatus 300 could predict optimally predicted motion vector $PMV_{enc}$ with the differential vector to be calculated and transmitted by encoding apparatus 200 and the previously reconstructed adjacent block information. The same decision function go is also used for predicting the predicted motion vector in decoding apparatus 300.

Assuming both encoding apparatus 200 and decoding apparatus 300 have prior knowledge of the definition of the selection function go, it can be variably defined as will be detailed for example below.

By means of Equation 6, encoding apparatus 200 performs an advance calculation of (estimated) predicted motion vector $PMV_{dec}$ that decoding apparatus 300 will find out, and then checks if decoding apparatus 300 could predict optimally predicted motion vector $PMV_{enc}$ and obtain the correctly reconstructed video data with the provided differential vector $DMV^D (=MV^D-PMV_{enc})$ and the previously reconstructed adjacent block information. In other words, encoding apparatus 200 advantageously rehearses what decoding apparatus 300 will process to feed such knowledge into its own encoding process.

Within step S504, steps S804 and S806 will be described in some aspects below.

First, an aspect of a method for determining predictability of optimally predicted motion vector $PMV_{enc}$ by decoding apparatus 300 is described.

When estimated predicted motion vector $PMV_{dec}$ calculated by Equation 6 in step S504 is equal to optimally predicted motion vector $PMV_{enc}$ selected in step S502, decoding apparatus 300 will be able to obtain the correctly reconstructed video data by adding its own estimation of the predicted motion vector, i.e. estimated predicted motion vector $PMV_{dec}$ to differential vector $DMV^D$ supplied by encoding apparatus 200. Therefore, when encoding apparatus 200 finds that its own election of optimally predicted motion vector $PMV_{enc}$ is equal to the estimated predicted motion vector $PMV_{dec}$ that it estimates decoding apparatus 300 would reach at, it determines predictability of the optimally predicted motion vector $PMV_{enc}$ by decoding apparatus 300, or else, it determines unpredictability. Or, depending on aspects, when encoding apparatus 200 finds that its own selection of optimally predicted motion vector $PMV_{enc}$ differs by less than a predetermined boundary value from the estimated predicted motion vector $PMV_{dec}$ that it estimates decoding apparatus 300 would reach at, it may determine predictability of the optimally predicted motion vector $PMV_{enc}$ by decoding apparatus 300, or else, unpredictability.

Another aspect of a method for determining predictability of optimally predicted motion vector $PMV_{enc}$ by decoding apparatus 300 is described.

In such cases as the video compression rate is high, video pixel values have little change, or video motion vectors are somewhat constant, even if optimally predicted motion vector $PMV_{enc}$ is not equal to the estimated predicted motion vector $PMV_{dec}$, it is possible that a motion compensated video data by the reconstructed motion vector through estimated predicted motion vector $PMV_{dec}$ (or by $MV'^D=DMV^D+PMV_{dec}$) is identical with the motion compensated video data by the reconstructed motion vector through optimally predicted motion vector $PMV_{enc}$ (or by $MV^D=DMV^D+PMV_{enc}$). In this case, regardless that optimally predicted motion vector $PMV_{enc}$ is not equal to estimated predicted motion vector $PMV_{dec}$ encoding apparatus 200 may determine predictability of the optimally predicted motion vector $PMV_{enc}$ by decoding apparatus 300, or else, it determines unpredictability.

Yet another aspect of a method for determining predictability of optimally predicted motion vector $PMV_{enc}$ by decoding apparatus 300 is described.

In an effort to further drive up the compression rate, reconstructed video data obtained using estimated predicted motion vector $PMV_{dec}$ and the reconstructed video data obtained using optimally predicted motion vector $PMV_{enc}$ may differ by the predetermined threshold value or less (for example, the two cases of reconstructed video data have their sums of absolute difference or SAD in a close range within a predetermined threshold value), and encoding apparatus 200 may still determine predictability of the optimally predicted motion vector $PMV_{enc}$ by decoding apparatus 300 with estimated predicted motion vector $PMV_{dec}$, or else, it determines unpredictability of the optimally predicted motion vector $PMV_{enc}$ by decoding apparatus 300 with estimated predicted motion vector $PMV_{dec}$.

To review the above several aspects of determining predictability, steps S804 and S806 may find the selected estimated predicted motion vector and the selected optimally predicted motion vector are equal or different by a predetermined threshold value or less and it can be decided that decoding apparatus 300 can predict the selected optimally predicted motion vector.

Additionally, steps S804 and S806 may find the reconstructed video data by the selected estimated predicted motion vector and the reconstructed video data by the selected optimally predicted motion vector are equal or different by a predetermined threshold value or less and it can be decided that decoding apparatus 300 can predict the selected optimally predicted motion vector.

Referring to FIG. 8, using a predefined decision function between encoding apparatus 200 and decoding apparatus 300, that is go in Equation 6, encoding apparatus 200 calculates values of decision function in step S800 and selects the candidate motion vector as in Equation 6 having the minimum of the calculated values of decision function as estimated predicted motion vector $PMV_{dec}$ in step S802. Then, a comparison is made between estimated predicted motion vector $PMV_{dec}$ and optimally predicted motion vector $PMV_{enc}$ in step S804 to eventually determine predictability.

The predefined decision function between encoding apparatus 200 and decoding apparatus 300 may be realized in diverse forms.

For decision function go of Equation 6 above, a function using template matching (TM) or boundary matching (BM) may be used.

Firstly described is about the decision function using TM. Template matching pixel index set or template matching set (TMS) may be defined as a set of indices for representing relative positions of selected pixels with a reference to a given designated block position as a reference and they may be exemplified by M number of pixel positions adjacent to the designated block from its left side, upper left side, and upper side. Requirements will diversify the method. Generally speaking, the more pixels TMS indicates, the more accurate matching is possible leaving increased calculation amount.

The template matching method, subsequent to defining the entire candidate predicted motion vectors selectable as a predicted motion vector, calculates differences between pixels indicated by TMS for the reference blocks designated by the respective candidate motion vectors in the defined candidate predicted motion vector set and pixels indicated TMS for the current block by using Equation 7 (an example of Equation 6) below to generate the matching error with respect to each of the candidate motion vectors and select the one having the least matching error as the above mentioned estimated predicted motion vector $PMV_{dec}$.

$$PMV_{dec} = \underset{PMVC \in CS}{\operatorname{argmin}} g(PMVC \mid DMV) \qquad \text{Equation 7}$$

$$g(PMVC \mid DMV) = \sum_{i \in TMS} [f(PMVC + DMV, i) - C(i)]^2$$

In Equation 7 showing f(PMVC+DMV, i), (PMVC+DMV) represents pixel positions indicated by neighboring index i (included in TMS) with respect to the reference block in the reference picture again indicated by index i, and f(PMVC+DMV, i) means the pixel values at the same positions.

An example of the decision function, g(PMVC|DMV) takes differential vector $DMV^D$ from encoding apparatus 200 and a candidate motion vector PMVC being an element from candidate motion vector set CS for use as the predicted motion vector to calculate the corresponding block's motion vector by PMVC+DMV, and then provides informative estimates for telling how correct the reconstructed blocks became through using the motion vectors in their motion compensations. For the purposes of the estimation, Equation 7 used sum of squared error. However, different applications may invite other methods such as sum of absolute difference. Estimated predicted motion vector $PMV_{dec}$ means the candidate motion vector (PMVC) which minimizes the example decision function g(PMVC|DMV).

Specifically, in FIG. 8, step S800 calculates differences of pixel values between pixels indicated by the set of template matching pixel indices (TMS) for the reference blocks designated by one or more respective candidate motion vectors in the defined candidate motion vector set and pixels indicated by the template matching pixel indices for the current block, and based on the calculated pixel value differences, executes the predefined decision function to calculate the values of the decision function.

In the following, the decision function using boundary pixel matching or boundary matching (BM) is described.

Similar to the earlier aspect of TMS, boundary matching pixel index set or boundary matching set (BMS) may be defined as a set of indices for indicating the positions of the pixels at the current block's leftmost and uppermost areas. Of course, it may be also defined as the positions of part or all of the pixels within the current block at the block boundary depending on applications.

Upon completion of defining the entire candidate motion vector set (CS) selectable as a predicted motion vector, in order to find which candidate motion vector (PMVC) is the fittest among the candidate motion vector set (CS), the boundary pixel matching is performed to estimate how smoothly the current block reconstructed from the encoded motion compensated data is connected with its adjacent blocks at its block boundary, and then select one effective candidate motion vector (PMVC) to minimize the boundary pixel matching error from candidate motion vector set (CS), as estimated predicted motion vector $PMV_{dec}$. It is called predicted motion vector picked up by the decoding apparatus 300.

This procedure is further detailed below. The current block's pixel value is first reconstructed by adding the differential vector (residual signal) calculated by encoding apparatus 200 to the reference block value designated by the candidate motion vector calculated by PMVC+DMV where candidate motion vector (PMVC) is one element, among candidate motion vector set (CS) and differential vector (DMV) is determined by encoding apparatus 200, then a determination is made on which predicted motion vector generates, among motion compensation reconstructions of the current block based on the respective candidate motion vectors, the particular reconstructed block having the highest degree of boundary matching to the current block's adjacent and previously reconstructed pixels. For this purpose, sum of squared error is used as in Equation 8 to calculate the matching errors contained in the respective candidate motion vectors. Of course, sum of absolute difference and other methods may be employed to calculate the matching errors.

$$PMV_{dec} = \underset{PMVC \in CS}{\operatorname{argmin}} g(PMVC \mid DMV) \qquad \text{Equation 8}$$

$$g(PMVC \mid DMV) = \sum_{i \in BMS} [f(i) - C(i)]^2$$

Equation 8 represents that the one element of candidate motion vector (PMVC) among candidate motion vector set (CS) and differential vector (DMV) determined by encoding apparatus 200 are calculated into PMVC+DMV that is the candidate motion vector which designates a reference block value and a motion compensated pixel residual signal calculated by encoding apparatus 200 is added thereto resulting in a reconstructed current block having reconstructed pixel values of which a particular pixel value is labeled C(i) identifying its designation by index i in the boundary matching pixel index set (BMS). Additionally, in the case of the current block's adjacent boundary pixels within adjacent blocks, f(i) means the value of an immediately adjacent pixel with respect to BMS index i's designated pixel. Using Equation 8, boundary pixel matching errors are calculated for the respective candidate motion vectors (PMVC) in the candidate motion vector set (CS) and a selection is made for the candidate motion vector generating the least matching error and it is titled as estimated predicted motion vector $PMV_{dec}$. This is called predicted motion vector picked up by the decoding apparatus 300.

In other words, step S800 in FIG. 1 calculates matching errors for one or more respective candidate motion vectors as the values of the decision function so that the decision function may be calculated through executing a predefined decision function, wherein the calculations are based on the difference between reconstructed pixel value designated by the boundary matching pixel index set BMS' index out of the current block reconstructed through adding the motion compensated residual signal calculated by the encoding apparatus to the reference block value designated by the candidate motion vector calculated by using the differential vectors determined by the encoding apparatus for one or more respective candidate motion vectors in the defined candidate motion vector set along with their corresponding candidate motion vectors, and an adjacent pixel of the pixel designated by the boundary matching pixel index set BMS' index out of the current block's adjacent boundary pixels within the adjacent block.

To review step S504 referring to FIG. 8, in steps S800 and S802, encoding apparatus 200 selects estimated predicted motion vector $PMV_{dec}$ having the least matching error determined in a preset determination method such as template matching or boundary pixel matching.

In step S804, a comparison is made to find equality between the selected estimated predicted motion vector $PMV_{dec}$ and optimally predicted motion vector $PMV_{enc}$ selected in step S502.

In step S806, following the described determination method, if estimated predicted motion vector $PMV_{dec}$ is equal to optimally predicted motion vector $PMV_{enc}$, it is determined that decoding apparatus 300 can predict the optimally predicted motion vector of the current motion vector of the current block, or else, unpredictability is determined. As is also specified above, even if estimated predicted motion vector $PMV_{dec}$ is not equal to optimally predicted motion vector $PMV_{enc}$, when their respective generations of reconstructed images do accord together or differ by less than a predetermined threshold value, the two estimated predicted motion vector $PMV_{dec}$ and optimally predicted motion vector $PMV_{enc}$ are considered identical and it can be determined that decoding apparatus 300 can predict the optimally predicted motion vector of the current motion vector of the current block.

Figure 9:
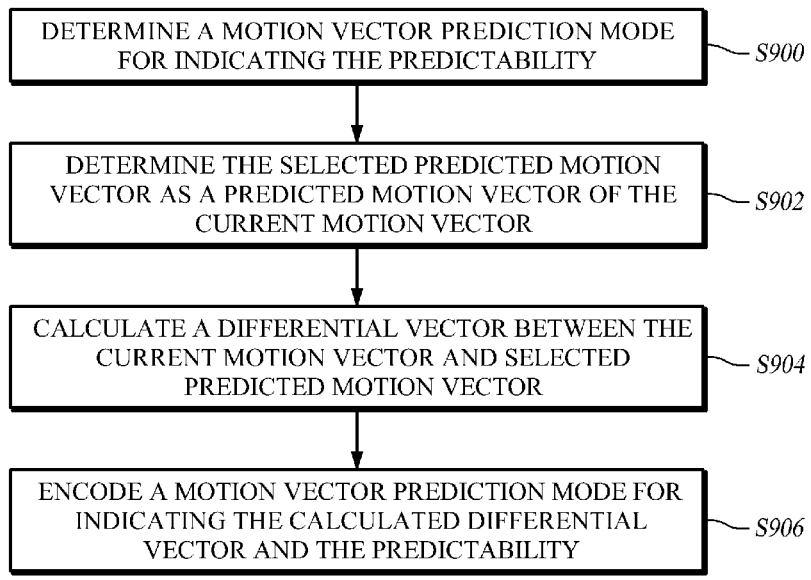
FIG. 9 is a flow diagram showing a first encoding step in a motion vector encoding method according to an aspect.

FIG. 9 is a flow diagram showing first encoding step S506 in the motion vector encoding method according to an aspect.

Referring to FIG. 9, first encoding step S506 in the motion vector encoding method includes determining a motion vector prediction mode for indicating the predictability in step S900, determining the selected predicted motion vector as a predicted motion vector of the current motion vector in step S902, calculating a differential vector between the current motion vector and the selected predicted motion vector in step S904, and encoding the current motion vector by encoding a motion vector prediction mode for indicating the calculated differential vector and the predictability in step S906.

Figure 10:
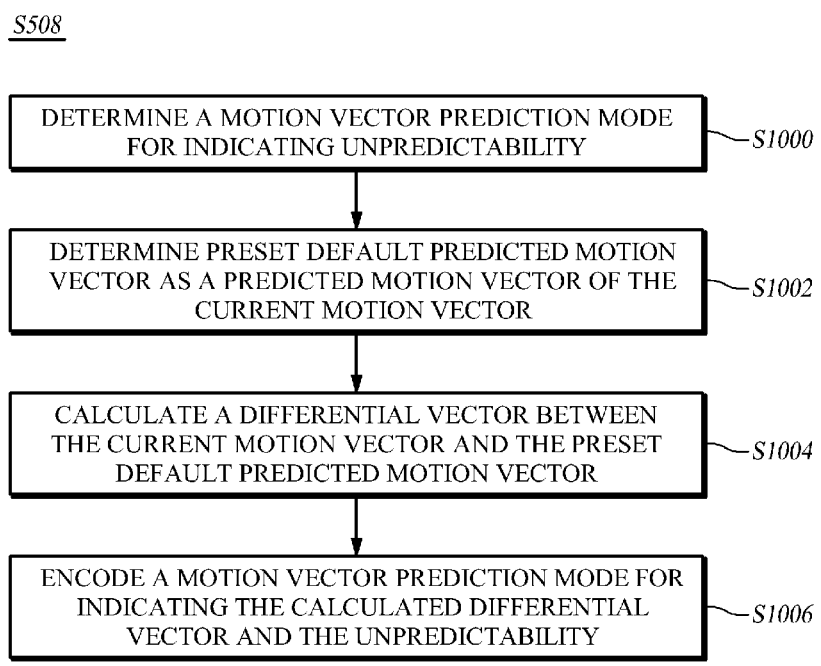
FIG. 10 is a flow diagram showing a second encoding step in a motion vector encoding method according to an aspect.

FIG. 10 is a flow diagram showing second encoding step S508 in the motion vector encoding method according to an aspect.

Referring to FIG. 10, second encoding step S508 in the motion vector encoding method according to an aspect includes determining a motion vector prediction mode for indicating the unpredictability in step S1000, determining the preset default predicted motion vector as a predicted motion vector of the current motion vector in step S1002, calculating a differential vector between the current motion vector and the preset default predicted motion vector in step S1004, and encoding the current motion vector by encoding a motion vector prediction mode for indicating the calculated differential vector and the unpredictability in step S1006.

The preset default predicted motion vector in step S1002 is a median of one or more adjacent blocks with respect to the current block and it is preset between encoding apparatus 200 and decoding apparatus 300.

FIG. 11 is a schematic flow diagram showing a motion vector decoding method according to an aspect.

Referring to FIG. 11, the motion vector decoding method includes decoding a differential vector between a current motion vector and its predicted motion vector and motion vector prediction mode information of the current motion vector in step S1100, selecting the predicted motion vector of the current motion vector based on the motion vector prediction mode information in step S1102, and reconstructing the current motion vector by using the selected predicted motion vector in step S1104.

The motion vector prediction mode information mentioned above is to indicate whether a decoding apparatus can predict other prediction vectors than a preset default predicted motion vector.

If the decoding apparatus cannot predict other prediction vectors than the preset default predicted motion vector, the motion vector prediction mode indicated by the motion vector prediction mode information is a default prediction mode. In addition, if the decoding apparatus can predict other prediction vectors than the preset default predicted motion vector, the motion vector prediction mode indicated by the motion vector prediction mode information is a non-default prediction mode.

If the motion vector prediction mode indicated by the motion vector prediction mode information is a default prediction mode, step S1102 for selecting the predicted motion vector selects the preset default predicted motion vector.

If the motion vector prediction mode indicated by the motion vector prediction mode information is a non-default prediction mode, step S1102 for selecting the predicted motion vector selects one of multiple candidate motion vectors as the predicted motion vector of the current motion vector by using a certain method.

The certain method may be based on a template matching or a boundary pixel matching.

Referring to FIG. 11 and further to FIGS. 12 and 13, a detailed description on the motion vector decoding method according to an aspect will follow.

FIG. 12 is a detailed flow diagram showing a motion vector decoding method according to an aspect.

Referring to FIG. 12, the motion vector decoding method provided by decoding apparatus 300 includes decoding an motion vector prediction mode and differential vector encoded by encoding apparatus 200 in step S1200; determining whether the decoded motion vector prediction mode indicates a predictability or an unpredictability in step S1202; if the decoded motion vector prediction mode indicates the predictability, defining a set of candidate motion vectors made available to select a predicted motion vector for reconstructing a current motion vector of a current block, selecting an optimally predicted motion vector in the defined candidate motion vector set, and determining the selected optimally predicted motion vector as a predicted motion vector of the current motion vector in step S1204; if the decoded motion vector prediction mode indicates the unpredictability, determining the preset default predicted motion vector as the predicted motion vector of the current motion vector in step S1206; and adding the decoded differential vector to the predicted motion vector determined in step S1204 for determining the selected optimally predicted motion vector or step S1206 for determining the preset default predicted motion vector as the predicted motion vector of the current motion vector so as to reconstruct the current motion vector of the current block in step S1208.

The differential vector in step S1200 is either a differential vector between the current motion vector and the selected one candidate motion vector determined as the predicted motion vector, or a differential vector between the current motion vector and the preset default predicted motion vector determined as the predicted motion vector.

FIG. 13 is a flow diagram showing first selection step S1204 for determining the predicted motion vector in the motion vector decoding method according to an aspect.

Referring to FIG. 13, first selection step S1204 of a predicted motion vector in the motion vector decoding method according to an aspect includes defining the set of candidate motion vectors made available to select a predicted motion vector for reconstructing the current motion vector of the current block in step S1300; calculating values of decision function for one or more respective candidate motion vectors included in the defined candidate motion vector set by using a decision function commonly defined in an encoding apparatus and a decoding apparatus in step S1302; and selecting a candidate motion vector having the minimum of the calculated values of decision function from the defined candidate motion vector set as an optimally predicted motion vector, and determining the selected optimally predicted motion vector as a predicted motion vector of the current motion vector in step S1304.

In step S1304, the optimally predicted motion vector determined by decoding apparatus 300 as the predicted motion vector of the current motion vector may be same as the estimated predicted motion vector $PMV_{dec}$, which the encoding apparatus 200 estimated its finding by the decoding apparatus 300 or reveal a difference by a boundary value.

Step S1302 for calculating values of decision function operates on performing the decision function for each reference block indicated by one or more respective candidate motion vector included in the defined candidate motion vector set by calculating value differences between pixels that a set of template matching pixel indices or template matching set (TMS) indicates and the pixels that the template matching pixel indices indicate for the current block, and based on the calculated pixel value differences, calculating respective matching errors corresponding to one or more candidate motion vectors as the values of the decision function.

In addition, step S1302 for calculating the values of decision function operates on performing the decision function by calculating matching errors of the one or more respective candidate motion vectors as the values of the decision function based on value differences between first pixels and second pixels. The first pixels are pixels generated from having the current block reconstructed through adding a motion-compensated residual signal calculated by the encoding apparatus to a candidate motion vector-designated reference block value calculated using a differential vector as determined by the encoding apparatus for each of the one or more candidate motion vectors in the defined candidate motion vector set and its corresponding candidate motion vector and receiving designations by indices in a boundary matching pixel index set or boundary matching set (BMS), and the second pixels are boundary pixels located in adjacent pixels with respect to the current block and received designations by the indices in the boundary matching pixel index set.

The sequences of the respective steps in the flow diagrams of FIGS. 4 through 12 are merely to explain the intrinsic characteristics of the disclosure in an aspect and they may switch orders well within the disclosed characteristics at their implementations.

According to the aspect as described above, motion vector prediction mode includes the default prediction mode and the non-default prediction mode. For an example of the default prediction mode, the negative motion vector prediction mode for indicating the unpredictability of the optimally predicted motion vector was described, and for the example non-default prediction mode, the positive motion vector prediction mode for indicating the predictability of the optimally predicted motion vector was described.

Herein, the optimally predicted motion vector meant to represent a selected predicted motion vector selected from a finite number of predicted motion vector candidates in a predetermined criteria or method.

In another aspect of the disclosure, the non-default prediction mode may be understood as a mode for selecting other predicted motion vector than the default predicted motion vector in a predetermined method and then using it for encoding/decoding the current motion vector. In this occasion, the predicted motion vector may be selected from the multiple predicted motion vector candidates in the predetermined method as mentioned above.

According to the disclosed motion vector encoding/decoding methods, there is provided the choice on the motion vector prediction modes to select the motion vector valued closer to the current motion vector as the predicted motion vector minimizing the bit quantity for encoding their differential vector, resulting in the efficiency improvement of video coding.

Further, according to the disclosed motion vector encoding/decoding methods, coupled with the efficiently better choice of more accurately predicted motion vector, the encoding apparatus is relieved from communicating all about the selected predicted motion vector with the decoding apparatus by either giving key information such as motion vector prediction mode information or sharing a searching function, thereby restricting the increase of bit quantity for encoding designated information to notify the predicted motion vectors which adds to the already improved encoding and decoding efficiency.

When applied to video services or multimedia streaming services, the disclosed motion vector encoding/decoding technique enables the coding job with less bit quantity to offer satisfactory services to end users. Especially, even greater effect will be on wireless mobile environments that may be more troubled with smaller bandwidths, greater data loss, and delays relative to wired environments.

Although exemplary aspects of the disclosure have been described for illustrative purposes, those skilled in the art will appreciate that various modifications, additions and substitutions are possible, without departing from the essential characteristics of the disclosure. Therefore, the aspects disclosed in the present disclosure have been described not for limiting the technical idea of the disclosure, but for explaining the disclosure. Accordingly, the scope of the disclosure should be interpreted by the appended claims, which by themselves and their equivalents are the claim scope of the disclosure.

INDUSTRIAL APPLICABILITY

As described above, the present disclosure is highly useful for application in the video encoding or decoding to provide the choice of the minimally different motion vector from the current motion vector as the predicted motion vector and obviate the needs to communicate all about the elected predicted motion vector with the decoding apparatuses by giving a searching information or by sharing a preset searching function, and thereby reduces the encoding bit quantity and improves the encoding and decoding efficiency.

The invention claimed is:

1. A method for decoding a current motion vector of a current block, which is located in a current picture, at an apparatus for decoding an encoded video, the method comprising:
    extracting, from a bitstream, mode information for use in selecting a motion vector prediction mode among a plurality of motion vector prediction modes, wherein the plurality of motion vector prediction modes are different from each other and indicate different ways to determine the current motion vector of the current block; and
    when the mode information indicates a first motion vector prediction mode among the plurality of motion vector prediction modes, performing a process comprising:
        decoding the bitstream to produce a differential vector of the current block;
        deriving a set of candidate motion vectors from motion vectors of a plurality of neighboring blocks of the current block,
            wherein the set of candidate motion vectors is used for determining a prediction motion vector of the current block, not determining the current motion vector itself of the current block, to be added to the produced differential vector,
            wherein the plurality of neighboring blocks include at least one block spatially adjacent to the current block in the current picture and at least one block in a reference picture other than the current picture, wherein a position of said at least one block in the reference picture is derived based on a position of the current block in the current picture;
        selecting a candidate motion vector from among the set of the candidate motion vectors;
        determining a prediction motion vector of the current block as the selected candidate motion vector, wherein the selected candidate motion vector has been derived from said at least one block spatially adjacent block or said at least one block in a reference picture; and
        reconstructing the current motion vector of the current block by adding the produced differential vector to the prediction motion vector of the current block,
    wherein the at least one block spatially adjacent to the current block includes one or more of blocks located at left, upper, upper right and upper left sides of the current block.

2. The method of claim 1, wherein the position of the at least one block in the reference picture is identical to the position of the current block in the current picture.

3. The method of claim 1, wherein the selecting comprises:
    selecting the candidate motion vector based on information included in the bitstream.

4. The method of claim 1, further comprising:
    reconstructing the current motion vector of the current block by using a predefined motion vector, when the motion information indicates a second motion vector prediction mode.

5. An apparatus for decoding a current motion vector of a current block, which is located in a current picture, to decode an encoded video, the apparatus comprising:
    a mode information decoder configured to extract, from a bitstream, mode information for use in selecting a motion vector prediction mode among a plurality of motion vector prediction modes, wherein the plurality of motion vector prediction modes are different from each other and indicate different ways to determine the current motion vector of the current block;
    a prediction mode determiner configured to determine whether the extracted mode information indicates a first motion vector prediction mode among the plurality of motion vector prediction modes; and
    a prediction motion vector determiner configured to, in response to the extracted mode information being indicative of the first motion vector prediction mode,
        derive a set of candidate motion vectors from motion vectors of a plurality of neighboring blocks of the current block,
            wherein the set of candidate motion vectors is used for determining a prediction motion vector of the current block, not determining the current motion vector itself of the current block, to be added to a differential vector,
            wherein the plurality of neighboring blocks include at least one block spatially adjacent to the current block in the current picture and at least one block in a reference picture other than the current picture, wherein a position of said at least one block in the reference picture is derived based on a position of the current block in the current picture;
        select a candidate motion vector from among the set of the candidate motion vectors; and
        determine a prediction motion vector of the current block as the selected candidate motion vector, wherein the selected candidate motion vector has been derived from said at least one block spatially adjacent block or said at least one block in a reference picture; and
    a reconstructor configured to reconstruct the current motion vector of the current block by adding the prediction motion vector of the current block to the differential vector produced by decoding the bitstream,
    wherein the at least one block spatially adjacent to the current block includes one or more of blocks located at left, upper, upper right and upper left sides of the current block.

6. The apparatus of claim 5, wherein the position of the at least one block in the reference picture is identical to the position of the current block in the current picture.

7. The apparatus of claim 5, wherein the prediction motion vector determiner is configured to select the candidate motion vector from the set of candidate motion vectors, based on information included in the bitstream.

8. The apparatus of claim 5, wherein the reconstructor is configured to reconstruct the current motion vector of the current block by using a predefined motion vector, when the motion information indicates a second motion vector prediction mode.

9. The method of claim 1, wherein the deriving the set of candidate motion vectors comprises:
    excluding one of two candidate motion vectors included in the set when the two candidate motion vectors have the same value.

10. The apparatus of claim 5, wherein the prediction motion vector determiner is configured to compare a first element and a second element included in the set and exclude one of the first element and the second element from the set when the first element and the second element have the same value.

* * * * *